Feb. 12, 1929.                          1,701,776
G. L. HINMAN
KNOB
Filed Nov. 15, 1927
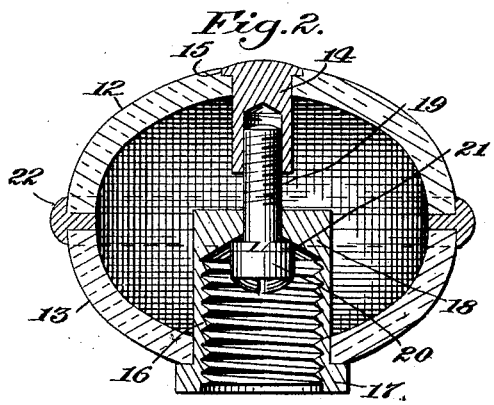
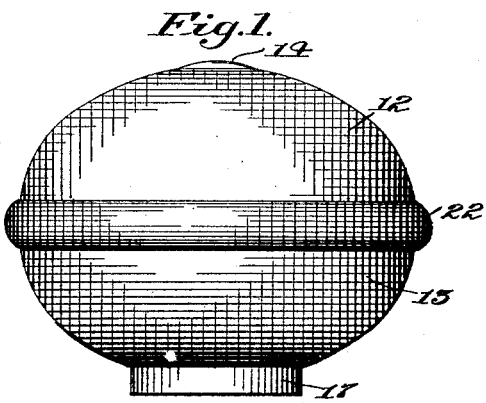
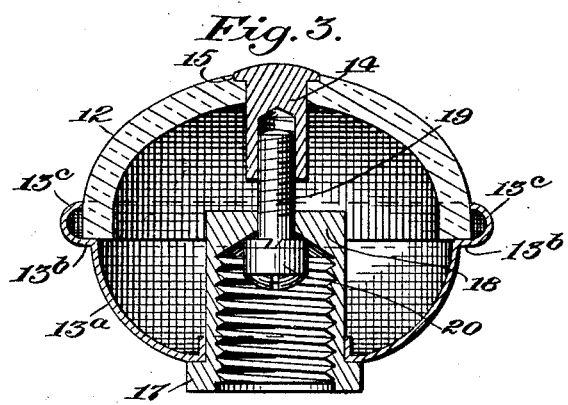
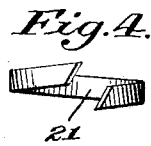
Inventor:
George L. Hinman,
by Calvert Calvin
Att'ys.

Patented Feb. 12, 1929.

1,701,776

UNITED STATES PATENT OFFICE.

GEORGE L. HINMAN, OF NEW HAVEN, CONNECTICUT, ASSIGNOR TO THE GREIST MANUFACTURING COMPANY, A CORPORATION OF CONNECTICUT.

KNOB.

Application filed November 15, 1927. Serial No. 233,384.

This invention relates to a knob of novel construction more especially intended for use at the top of an automobile gear shift lever, but which may be used for other purposes, as for a door knob or the like, such as is used in builders' hardware. This improved knob comprises two approximately semi-spherical or dome-like and preferably hollow parts in one of which is mounted a centrally disposed internally threaded nut and the other of which has fixed thereto an internally threaded sleeve or bushing having an outer flange impinging against the outer surface of the last-named part, said sleeve or bushing having an internal flange through which loosely passes a headed screw engaging the internally threaded nut on the said first-named part. The joint between the two parts of the knob is covered by a ring which is preferably rounded in cross section on its outer surface and which ring may be a separate part, independent of the two semi-spherical parts of the knob, or it may be formed integral with one of said semi-spherical parts.

In the accompanying drawing Fig. 1 is an elevation of one form of the improved knob. Fig. 2 is a central section of the same. Fig. 3 is a central section of a somewhat different form of the invention from that shown in Figs. 1 and 2, and Fig. 4 is a detail view of a spring washer.

Referring to Figs. 1 and 2 of the drawing, 12 and 13 denote the two approximately semi-spherical hollow parts of the improved knob. Mounted centrally in the part 12, and fixed thereto against rotation, is an internally threaded nut 14 having an outer flange 15 which is slightly rounded externally to conform to the curvature of the outer surface of the said part 12, and thus afford a neat finish.

Mounted in the semi-spherical part 13, and preferably fixed thereto, is an internally threaded sleeve or bushing 16 having an outer flange 17 impinging against the outer surface of the part 13, said sleeve having an internal flange 18 through which loosely passes a screw 19 the head 20 of which presses directly or indirectly on the said flange 18 and which screw engages the internally threaded nut 14. Between the head of the screw 19 and the internal flange 18 of the sleeve or bushing 16 is located a locking spring washer 21 shown in detail in Fig. 4, and which will prevent the said screw from becoming loose, said screw holding the two semi-spherical parts of the knob together, as will be understood.

The parts 12 and 13 may be of casein, metal, vulcanized fiber, porcelain or other suitable material, but will preferably be of some non-metallic substance.

The joint between the two semi-spherical parts 12 and 13 is covered by a rounded outer part of a ring 22 having an inwardly extending flange against which the two adjacent edges of the hollow semi-spherical knob parts 12 and 13 impinge. It will thus be understood that the said ring covers the joint between these two parts, and that this rounded exterior construction affords a neat finish to the knob.

In the slightly modified construction shown in Fig. 3 the part 12 of the knob, and the parts by which the two parts of the knob are held together, are the same as in Figs. 1 and 2, while the part 13$^a$ is of sheet metal and is constructed with a shoulder 13$^b$ against which the part 12 fits; and outside of this shoulder is a rounded rib 13$^c$ which covers the joint between the two semi-spherical parts of the knob.

It will be understood that in either form of the invention shown the internally threaded sleeve or bushing adapts the knob to be screwed to the top of an automobile gear shift lever or to some other part or spindle.

From the foregoing it will be understood that the invention provides a knob of simple construction especially adapted for use on an automobile gear shift lever, but which, as hereinbefore stated, may be used for other purposes.

Having thus described my invention I claim and desire to secure by Letters Patent:

1. A knob comprising two approximately semi-spherical hollow parts, an internally threaded nut, having an outer flange, mounted in one of said parts, an internally threaded bushing, having outer and inner flanges, mounted in the other of said parts, and a screw connecting said bushing and nut to hold the said parts together.

2. A knob comprising two approximately semi-spherical hollow parts, an internally threaded nut, having an outer flange, mounted in one of said parts, an internally threaded bushing, having outer and inner flanges, mounted in the other of said parts, means for covering the joint between said parts, and a screw connecting said bushing and nut to hold the said parts together.

3. A knob comprising two approximately semi-spherical hollow parts, an internally threaded nut, having an outer flange, mounted in one of said parts, an internally threaded bushing, having outer and inner flanges, mounted in the other of said parts, a ring serving to cover the joint between said parts, and a screw connecting said bushing and nut to hold the said parts together.

In testimony whereof I affix my signature.

GEORGE L. HINMAN.